H. E. R. LITTLE.
PRIMARY BATTERY.
APPLICATION FILED MAY 15, 1914.

1,163,834.

Patented Dec. 14, 1915.

WITNESSES
Geo. W. Naylor
A. L. Kitchin

INVENTOR
Homer E. R. Little
BY Munn & Co
ATTORNEYS

UNITED STATES PATENT OFFICE.

HOMER E. R. LITTLE, OF NEW YORK, N. Y.

PRIMARY BATTERY.

1,163,834.  Specification of Letters Patent.  Patented Dec. 14, 1915.

Application filed May 15, 1914. Serial No. 838,697.

*To all whom it may concern:*

Be it known that I, HOMER E. R. LITTLE, a citizen of the United States, and a resident of the city of New York, borough of Manhattan, county and State of New York, have invented a new and Improved Primary Battery, of which the following is a full, clear, and exact description.

This invention relates to improvements in primary batteries, and has for an object to provide an improved structure in which a maximum current and also a maximum voltage may be secured at any time without injury to the cell.

Another object of the invention is to provide in a single cell means for producing an exceptionally large amperage for a given sized cell.

A further object of the invention is to provide a primary battery in which one of the active elements is a gas supplied continuously during the use of the cell, and is also an improved form of battery to that shown in my prior Patent No. 1,060,468, issued April 29, 1913.

A still further object of the invention is to provide an improved structure whereby the gas is more intimately brought in contact with the elements in the electrolyte upon which it acts, and also presents means whereby the exciting gas can be readily and rapidly regulated to meet any demand of a discharge varying from nothing to a maximum output.

In carrying out the objects of the invention a housing, preferably of steel is provided, in which a plurality of electrodes are arranged, some of which are metal, as for instance zinc, and others of which are carbon. These electrodes are spaced apart and are electrically connected by a suitable electrolyte so that when the proper gas is forced into the cell a chemical action will result for producing or causing an electrical current to be generated. The continuous supplying of new gas will maintain the battery or cell in a working condition until certain of the parts have been entirely consumed or dissolved by the action of the gas and electrolyte, whereupon new parts must be substituted in order to continue the use of the cell. In forcing the gas into the cell or battery the same is forced into the electrolyte at the bottom of the cell, whereupon the gas bubbles up through the electrolyte and thereby causes a more even action on the metal plate.

Figure 1:
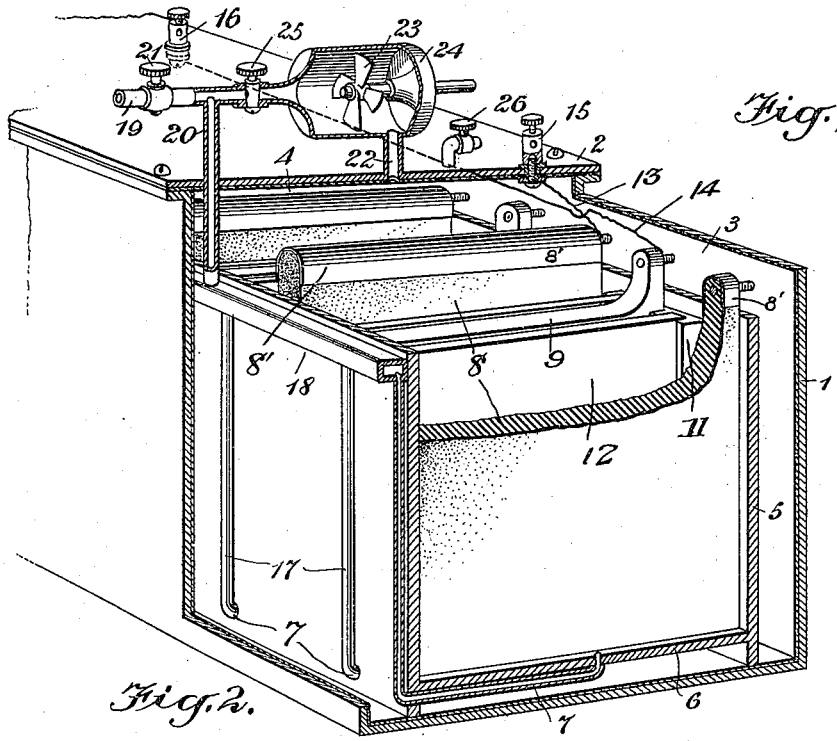
Figure 2:
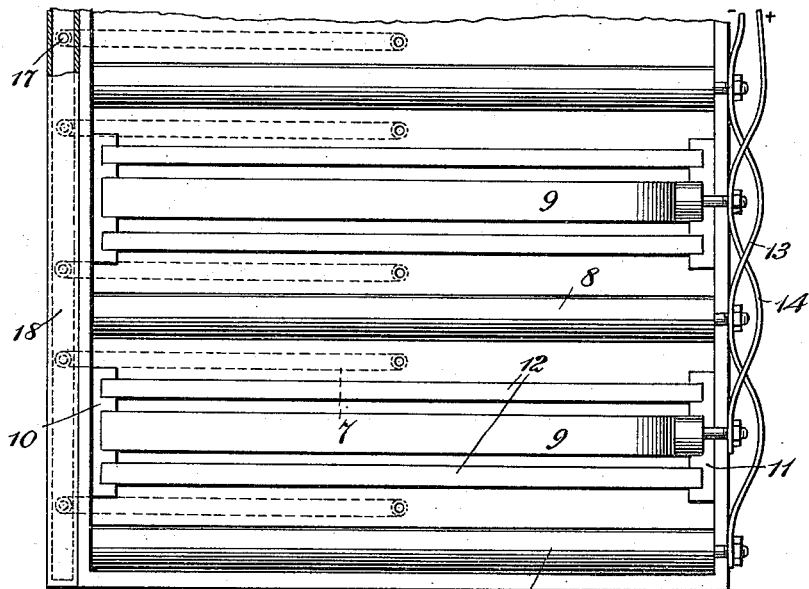

In the accompanying drawings Figure 1 is a fragmentary perspective view of a primary battery or cell embodying the invention, certain parts being broken away for better illustrating the construction; Fig. 2 is a top plan view of one end of the battery.

In forming a device embodying the invention it will be understood that the active elements are a metal, preferably zinc, and a halogen, as for instance chlorin or bromin. The zinc is arranged in plates and acts as one electrode, while carbon sheets are arranged between the respective zinc plates for acting as the opposite electrodes. The active agents, namely, the zinc and halogen are so arranged that by a continuous supply of the chlorin gas the action of the battery will be continued until the zinc or other active member is consumed.

Referring to the accompanying drawings by numeral, 1 indicates a housing, preferably steel, which housing is provided with a steel covering 2, and which is lined with an insulating material 3 formed preferably of celluloid or rubber. The top 2 is also preferably provided with a lining 4 of celluloid or rubber. This lining prevents any action of the halogen salts on the housing 1.

Arranged in housing 1 is a receptacle 5 formed preferably of celluloid, which receptacle is provided with a bottom 6 spaced from the bottom of housing 1, whereby the pipes 7 may be led to any desired point beneath bottom 6 so as to discharge the gas centrally of the bottom or at any other preferable point. Any desired spacing means may be provided for holding the sides and also the ends of the receptacle 5 from the housing 1, as for instance corner blocks (not shown). Arranged within the receptacle 5 are carbon electrodes 8 and zinc electrodes 9. The carbon electrodes 8 may be loosely placed in position or held in position by suitable guideways, as desired, while the zinc plates or electrodes 9 are preferably fitted into retaining members 10 and 11, which retaining members are provided with slots for the zinc plate and also slots for sheets 12. The sheets 12 are preferably woven asbestos cloth and are secured in grooves in members 10 and 11 by any desired means, as for instance a suitable cement which will not be attacked by the electrolyte. The holding members 10 and 11 are preferably formed of celluloid and are connected with the receptacle in any desired manner, as for instance by being cemented thereto.

As shown in Fig. 2 of the drawing the carbon electrodes and the zinc electrodes alternate, whereby a large current may be drawn from a single battery. Suitable connecting wires 13 and 14 are provided for connecting in multiple the various carbon electrodes, and also for connecting in multiple the various zinc electrodes. These connecting members may be secured to the electrodes in any desired manner, as for instance by suitable nuts. The connecting members 13 and 14 are secured or connected with the binding posts 15 and 16, respectively, so that the battery may be easily attached to any suitable wiring. In forming the carbon electrodes 8 the upper end thereof is impregnated with paraffin and then electroplated so as to provide a good contact member 8′ to which the conductors 13 and 14 are secured. A coating of paint is used on the metal plating so as to protect the same against the action of the gas used, and also against the electrolyte.

Arranged in the receptacle 5 is an electrolyte which is preferably of sufficient depth to submerge the zinc plates except the part carrying the conductors 13 and 14. This electrolyte is preferably an aqueous solution of a halogen salt, of which salt the chemical affinity of its halogen radical is less than that of the gas admitted to the cell for the operation thereof. Preferably this halogen salt is a solution of a bromin salt, as for instance zinc bromid. This solution also serves to dissolve the salt formed during the discharge of the cell. In order to cause a proper action between the electrodes chlorin gas is brought into contact with the electrolyte, whereupon halogens of lower chemical affinity are liberated which react through the electrolyte on the zinc electrode to again form zinc halogen and thereby produce an electrical current.

In order to allow the chlorin gas to act in the best possible manner, and to act over an appreciable area the same is led into the receptacle 5 through any desired number of pipes 17, which pipes are led from a general supply pipe 18 to a point substantially central of the bottom 6, that is, at a distance halfway between the sides of the receptacle. There is a pipe 17 discharging gas between each pair of electrodes, as shown in Fig. 2, preferably between the carbon and the asbestos sheet 12, whereby the gas is caused to act more evenly upon the zinc plate 9. It is to be understood of course that the gas is forced into the battery under pressure and thereby bubbles up through the electrolyte. The gas may be stationed in any suitable tank under pressure so as to supply pipe 19 continually with gas, which gas is allowed to pass into pipe 20 and from thence into pipe 18 when valve 21 is opened. Valve 21 may be of any desired variety, and if preferable may be connected with a suitable operating member at a distant point so that the flow of gas into the battery may be regulated for producing the amount of current necessary in any particular circumstance. Ordinarily, the gas does not reach the surface of the electrolyte, but if the same should be supplied in such quantities as to pass to the space above the electrolyte the same may be drawn through pipe 22 by a suitable fan 23 arranged in housing 24 and forced from said housing to pipe 20 through valve 25, said valve being of course open at that time. Usually the valve 25 is maintained closed so that the gas from supply pipe 19 may pass only to the lower part of the receptacle 5. When valve 25 is open and fan 23 is operating, the valve 21 may be closed if the pressure in pipe 19 is too great to be overcome by fan 23, so that the gas drawn from the housing by fan 23 may pass into pipe 20 and from thence be distributed to the electrolyte. The fan 23 may be operated by any desired means, as for instance an electrical motor.

In operation when it is desired to draw current from the battery, valve 21 is turned on, whereupon chlorin gas will be admitted to the bottom of the receptacle 5 and bubble up through the electrolyte positioned therein. This causes a proper chemical action for producing an electrical current, which current may be taken off the binding posts 15 and 16, said binding posts being connected with the respective electrodes by conductors 13 and 14. During the first operation of the battery valve 26 is left open until all of the air has escaped from the battery, whereupon the same is closed.

Since the chlorin gas used liberates halogens of lower chemical affinity from its combinations as for instance bromin, these halogens are rapidly liberated, and, if the cell is in operation, immediately react through the electrolyte on the electrode to again form zinc halogen, thereby producing an electrical current. This halogen is again released by more chlorin, but again reacts on the zinc electrode to again form zinc halogen. This process is continuously repeated as long as gas is supplied, or until the zinc has been consumed. The bromin or other halogen of lower chemical affinity acts as an intermediary between the chlorin gas and the metallic electrode. When the electrolyte is zinc bromid and the chlorin gas is admitted to the bottom of the receptacle the same passes upwardly in bubbles from the bottom of the cell through the solution of zinc bromid and unites with the zinc salt in the solution of zinc bromid, thus liberating bromin. It will be noted that this chlorin does not act directly on the zinc electrode (except perhaps in small quantities, which may be absorbed as gas when all or nearly all of the bromin is liberated) but on the zinc salt in solution. The chlorin does not act as a depolarizer as commonly called, namely, by mechanically removing the hydrogen bubbles, nor in its action does it produce hydrogen at one of the poles so that there is no necessity for a mechanical agitation. By this arrangement the chlorin gas acts on the salt in solution, liberating a new element, bromin, which becomes the active element and reacts on the negative or metal electrode, thus producing an electrical current at the poles. In forming the various parts it is of course to be understood that the same must be made of material adapted to withstand the action of the electrolyte and gas except of course the active agents. For instance, the pipes 10, 17, 18, and receptacle 5 are preferably formed from celluloid though glass or other suitable material may be utilized.

What I claim is—

1. A primary cell comprising a housing, a carbon plate arranged in said housing, a zinc plate arranged in said housing, an electrolyte positioned in said housing, said electrolyte falling short of the top of the housing, a pipe for directing an active element into said housing adjacent the bottom thereof, said element being in the form of a gas, whereby the same bubbles up through the electrolyte for causing an electrical tension between the zinc plate and said carbon plate, and means in communication with the upper part of the housing for drawing off the gas escaping to the upper part of said housing.

2. A primary battery comprising a housing, a zinc plate vertically arranged in said housing, a carbon plate arranged vertically in said housing, said carbon plate being substantially parallel with said zinc plate, a spacing and protecting sheet of asbestos arranged between said plates, a pair of guiding ways for holding said sheet of asbestos in place and out of contact with either of said plates, an electrolyte arranged in said housing, said electrolyte connecting said plates and impregnating said asbestos sheet, a pipe for guiding an active agent in the form of gas to a point between said plates and adjacent the bottom of the housing so that the gas may bubble up through the electrolyte between said carbon plate and said asbestos sheets and thereby cause an electric tension between the zinc plate and the carbon plate and means for drawing off excess gas.

3. A primary cell comprising a housing, a carbon plate arranged in said housing, a zinc plate arranged in said housing, an electrolyte arranged in said housing, said electrolyte falling short of the top of the housing, a pipe for directing an active element into said housing adjacent the bottom thereof, said active agent being in the form of gas, whereby the same bubbles up through said electrolyte for causing an electrical tension between said zinc plate and said carbon plate, and means connected with the upper part of said housing and said pipe for drawing off the gas escaping to the upper part of said housing and forcing the same into said pipe so as to be again forced through said electrolyte.

4. A primary cell comprising a housing, a plurality of zinc plates arranged in said housing, a plurality of carbon plates arranged parallel to said zinc plates, all of said plates being arranged substantially vertical, an electrolyte arranged in said housing, means for directing an active agent in the form of gas to the lower part of said housing and between the respective zinc plates and carbon plates so as to bubble up between said plates, the gas reacting with the electrolyte for causing an electric tension between the zinc plates and carbon plates, the excess gas escaping to the upper part of the housing above the electrolyte, and a fan for drawing the excess gas from the upper part of said housing and forcing the same into the means which directs the gas to the lower part of the housing.

In testimony whereof I have signed my name to this specification in the presence of two subscribing witnesses.

HOMER E. R. LITTLE.

Witnesses:
W. B. POGGENBURG,
C. H. WILKINS.

Copies of this patent may be obtained for five cents each, by addressing the "Commissioner of Patents, Washington, D. C."